US008171702B2

(12) United States Patent
Schiebout et al.

(10) Patent No.: US 8,171,702 B2
(45) Date of Patent: May 8, 2012

(54) METHOD FOR PERFORMING A SEALING OPERATION ON A MOVING WEB

(75) Inventors: David Schiebout, Brainerd, MN (US); Jeffrey T. Bruin, Anoka, MN (US)

(73) Assignee: Delta Industrial Services, Inc., Minneapolis, MN (US)

( * ) Notice: Subject to any disclaimer, the term of this patent is extended or adjusted under 35 U.S.C. 154(b) by 0 days.

(21) Appl. No.: 12/835,616

(22) Filed: Jul. 13, 2010

(65) Prior Publication Data

US 2010/0273621 A1 Oct. 28, 2010

Related U.S. Application Data

(60) Division of application No. 12/356,161, filed on Jan. 20, 2009, now Pat. No. 7,775,018, which is a continuation of application No. 11/609,597, filed on Dec. 12, 2006, now Pat. No. 7,497,065.

(60) Provisional application No. 60/750,006, filed on Dec. 13, 2005.

(51) Int. Cl.
*B31B 1/64* (2006.01)

(52) U.S. Cl. ....... 53/371.3; 493/189; 493/201; 493/209; 53/371.5; 53/374.5

(58) Field of Classification Search .......... 53/477, 53/479, 271, 370.5, 371.3, 371.5, 371.6, 53/374.5, 374.6; 493/189, 193, 196, 197, 493/201, 205, 209
See application file for complete search history.

(56) References Cited

U.S. PATENT DOCUMENTS

| | | | |
|---|---|---|---|
| 4,274,554 A | 6/1981 | Malpas | |
| 5,105,603 A * | 4/1992 | Natterer | 53/412 |
| 5,347,795 A | 9/1994 | Fukuda | |
| 5,753,067 A | 5/1998 | Fukuda et al. | |
| 5,803,888 A | 9/1998 | Severs et al. | |
| 5,956,924 A | 9/1999 | Thieman | |
| 6,272,815 B1 | 8/2001 | Todd et al. | |
| 6,309,487 B1 | 10/2001 | Herrin et al. | |
| 6,389,780 B1 | 5/2002 | Coomber et al. | |
| 6,452,354 B1 | 9/2002 | Ellsworth et al. | |
| 6,481,188 B1 | 11/2002 | Graham et al. | |
| 6,820,392 B2 | 11/2004 | Helwig et al. | |
| 6,862,867 B2 * | 3/2005 | Cady et al. | 53/434 |
| 6,931,824 B2 | 8/2005 | Rogers | |

(Continued)

OTHER PUBLICATIONS

"U.S. Appl. No. 11/609,597, Response filed Jan. 23, 2008 to Restriction Requirement mailed Jan. 8, 2008", 8 pgs.

(Continued)

*Primary Examiner* — Hemant M Desai

(74) *Attorney, Agent, or Firm* — Schwegman, Lundberg & Woessner, P.A.

(57) ABSTRACT

Various device embodiments include first and second plate assemblies. Each plate assembly includes a base, a seal plate, one or more air bladders and a servo motor to provide a linear motion of the seal plate with respect to the base. The device further includes at least one plate assembly motor operably linked to the bases of the plate assemblies to provide a linear motion of the first and second plate assemblies toward each other to perform a sealing operation and away from each other. The device further includes a controller connected to the at least one plate assembly motor and to the first and second servo motors to coordinate the motion of the first and second seal plates to perform a seal operation on a web while traveling with the web.

20 Claims, 17 Drawing Sheets

U.S. PATENT DOCUMENTS

| | | | |
|---|---|---|---|
| 7,059,103 | B2 * | 6/2006 | Ninomiya et al. ............... 53/450 |
| 7,117,777 | B1 | 10/2006 | Wilkes |
| 7,497,065 | B2 | 3/2009 | Schiebout et al. |
| 2001/0008064 | A1 | 7/2001 | Todd et al. |
| 2006/0016154 | A1 | 1/2006 | Rogers |
| 2006/0096254 | A1 | 5/2006 | Rogers |
| 2007/0135285 | A1 | 6/2007 | Schiebout et al. |
| 2009/0124479 | A1 | 5/2009 | Schiebout et al. |

OTHER PUBLICATIONS

"U.S. Appl. No. 11/609,597, Response filed Jun. 20, 2008 to Non-Final Office Action mailed Mar. 31, 2008", 14 pgs.

"U.S. Appl. No. 11/609,597, Response filed Sep. 29, 2008 to Final Office Action mailed Jul. 29, 2008", 16 pgs.

"U.S. Appl. No. 11/609,597, Restriction Requirement mailed Jan. 8, 2008", 5 pgs.

"U.S. Appl. No. 11/609,597 Notice of Allowance Mailed on Oct. 17, 2008", NOAR, 6 Pgs.

"U.S. Appl. No. 11/609,597 Non-Final Office Action mailed Mar. 31, 2008", OARN, 9pgs.

"U.S. Appl. No. 12/356,161, Non-Final Office Action mailed Oct. 6, 2009", 12 Pgs.

"U.S. Appl. No. 12/356,161, Notice of Allowance mailed Apr. 5, 2010", 6 pgs.

"U.S. Appl. No. 12/356,161, Response filed Jan. 6, 2010 to Non Final Office Action mailed Oct. 6, 2009", 15 pgs.

"U.S. Appl. No. 11/609,597 Final Office Action mailed Jul. 29, 2008", FOAR, 09 pgs.

* cited by examiner

METHOD FOR PERFORMING A SEALING OPERATION ON A MOVING WEB

RELATED APPLICATIONS

This patent application is a division of U.S. patent application Ser. No. 12/356,161, filed Jan. 20, 2009, now U.S. Pat. No. 7,775,018, issued on Aug. 17, 2010, which is a continuation of U.S. patent application Ser. No. 11/609,597, filed Dec. 12, 2006, now U.S. Pat. No. 7,497,065, issued on Mar. 3, 2009, which claims the benefit of priority, under 35 U.S.C. Section 119(e), to U.S. Provisional Patent Application Ser. No. 60/750,006, filed on Dec. 13, 2005, which applications are all incorporated herein by reference in their entirety.

TECHNICAL FIELD

This application relates generally to sealers or packagers and, more particularly, to devices for sealing product processed by web converting equipment.

BACKGROUND

Traditional sealers for web converting equipment use a heated pattern roller. The ability of the roller to control the pressure and heat seal dwell time of the sealing operation is limited.

SUMMARY

Various aspects relate to a device. Various device embodiments include first and second plate assemblies. Each plate assembly includes a base, a seal plate and a servo motor to provide a linear motion of the seal plate with respect to the base. The device further includes at least one plate assembly motor operably linked to the bases of the plate assemblies to provide a linear motion of the first and second plate assemblies toward each other to perform a sealing operation and away from each other. The device further includes a controller connected to the at least one plate assembly motor and to the first and second servo motors to coordinate the motion of the first and second seal plates to perform a seal operation on a web while traveling with the web.

Various aspects relate to a method for performing a sealing operation on a traveling web. According to various embodiments, the web is moved along a web path passing between a first seal plate and a second seal plate. A motion profile for the first seal plate and the second seal plate is implemented. The motion profile includes a first vector component in which the first and second seal plates are moved substantially parallel with the web path at a velocity substantially equal to a velocity of the web, and a second vector component in which the first and second seal plates are moved into contact with the web to perform the sealing operation while the web moves along the web path.

Various aspects relate to a system. Various system embodiments comprise means for matching a velocity of a first seal plate and a second seal plate in a first direction with a velocity of a traveling web passing between the first seal plate and the second seal plate, and means for moving the first seal plate and the second seal plate together to seal the web while the web is traveling.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

Figure 1A:
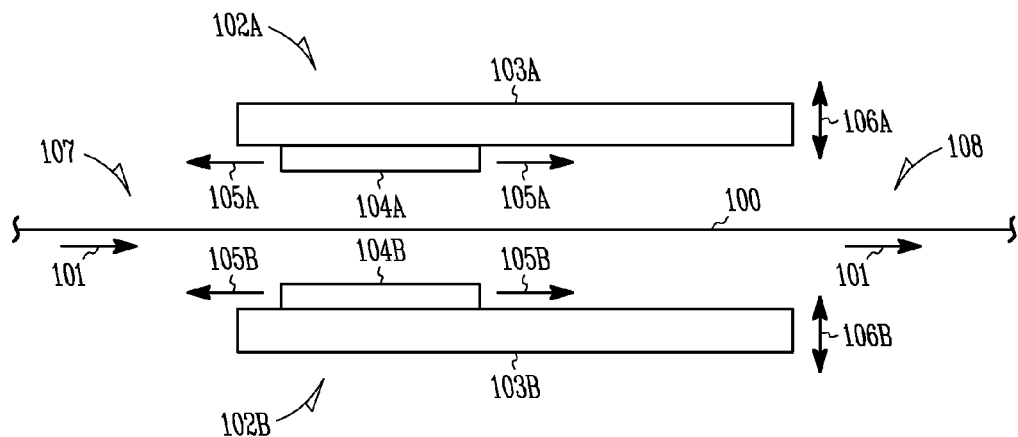
FIG. 1A-1C illustrate a reciprocating sealer for web converters, according to various embodiments of the present subject matter.
Figure 1B:
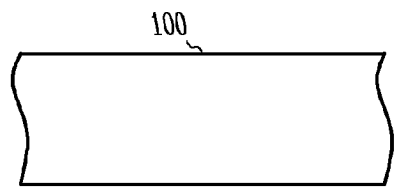
Figure 1C:
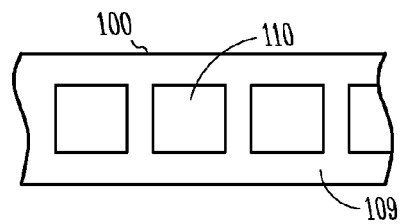

FIG. 1A-1C illustrate a reciprocating sealer for web converters, according to various embodiments of the present subject matter. FIG. 1A illustrates a web 100 traveling in a direction represented by arrows 101. Those of ordinary skill in the art will understand upon reading and comprehending this disclosure, how to use the reciprocating sealer with various web and product arrangements. The illustrated web can include product between a bottom web and a top web or can include a web folded longitudinally in the direction of web travel to provide the folded web with a bottom folded portion, a top folded portion and product therebetween. The system includes a first plate assembly 102A with a first base 103A, a first seal plate 104A, and a first linear servo motor to provide a linear motion of the first seal plate with respect to the first base, as illustrated by arrows 105A. A second plate assembly 102B includes a second base 103B a second seal plate 104B, and a second linear servo motor to provide a linear motion of the second seal plate with respect to the second base, as illustrated by arrows 105B. At least one plate assembly motor is operably linked to the first base 103A and the second base 103B to provide a linear motion, as illustrated by arrows 106A and 106B, of the first and second plate assemblies toward each other to perform a sealing operation and away from each other. The illustrated linear motion 106A-B of the first and second plate assemblies is substantially orthogonal to the linear motion 105A of the first seal plate with respect to the first base and the linear motion 105B of the second seal plate with respect to the second base. A controller is connected to the at least one plate assembly motor and to the first and second linear servo motors to coordinate the motion of the first and second seal plates to perform a seal operation on a web while traveling with the moving web. Thus, for example, the controller is able to control the velocity of the web and the horizontal velocity of the seal plates to match the seal plate velocities to the web velocity during a seal operation. In some embodiments, the controller receives a signal from a sensor or sensors, indicative of the web velocity, or receives a communication signal informing the controller of the web velocity. FIGS. 1B-1C illustrate the results of a sealing operation. The web 100 illustrated in FIG. 1B represents the web at 107, and the web 100 illustrated in FIG. 1C represents the web at 108. As illustrated in FIG. 1C, the sealed web 100 includes sealed margins 109 surrounding pouches 110 containing a product. The specific seal depends on the tooling used in the seal plates.

Figure 2:
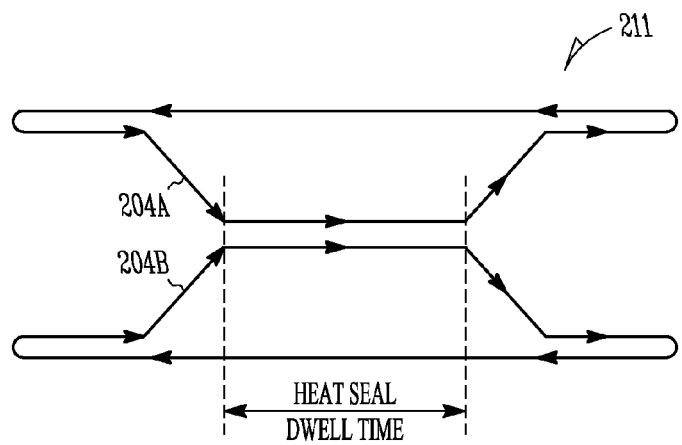
FIG. 2 illustrates an embodiment of a seal plate motion profile.

FIG. 2 illustrates an embodiment of a seal plate motion profile. The seal plates are illustrated as 104A and 104B in FIG. 1A, for example. The illustrated motion profile 211 can be implemented when the web is moving and passing between the plate assemblies. The profile 211 includes a motion profile 204A for the first or top plate assembly 104A, and a motion profile 204B for the second or bottom plate assembly 104B. In the illustrated example, as the plates move from left to right, the plates move into operational contact with the web to perform a sealing operation, as illustrated by the heat seal dwell time, and then move away from the web. The plates return, moving from right to left in the illustrated example, where the motion profile begins again. Thus, the profile illustrates a reciprocating motion. The profile may include parameters describing a dwell time, a closing ramp, an opening ramp, and a velocity. The dwell time dictates the amount of time the seal plates will remain engaged together to seal the web. The open and closing ramp parameters dictate the acceleration with which the controller will move the plate assembly servo motor to either open or close the seal plates. The velocity parameter dictates the maximum velocity at which the controller attempts to move the plate assembly servo motor when opening and closing the seal plates. The specifics of the profile, such as dwell time, the closing ramp, the opening ramp, the velocity, may be programmed into the controller.

Figure 3:
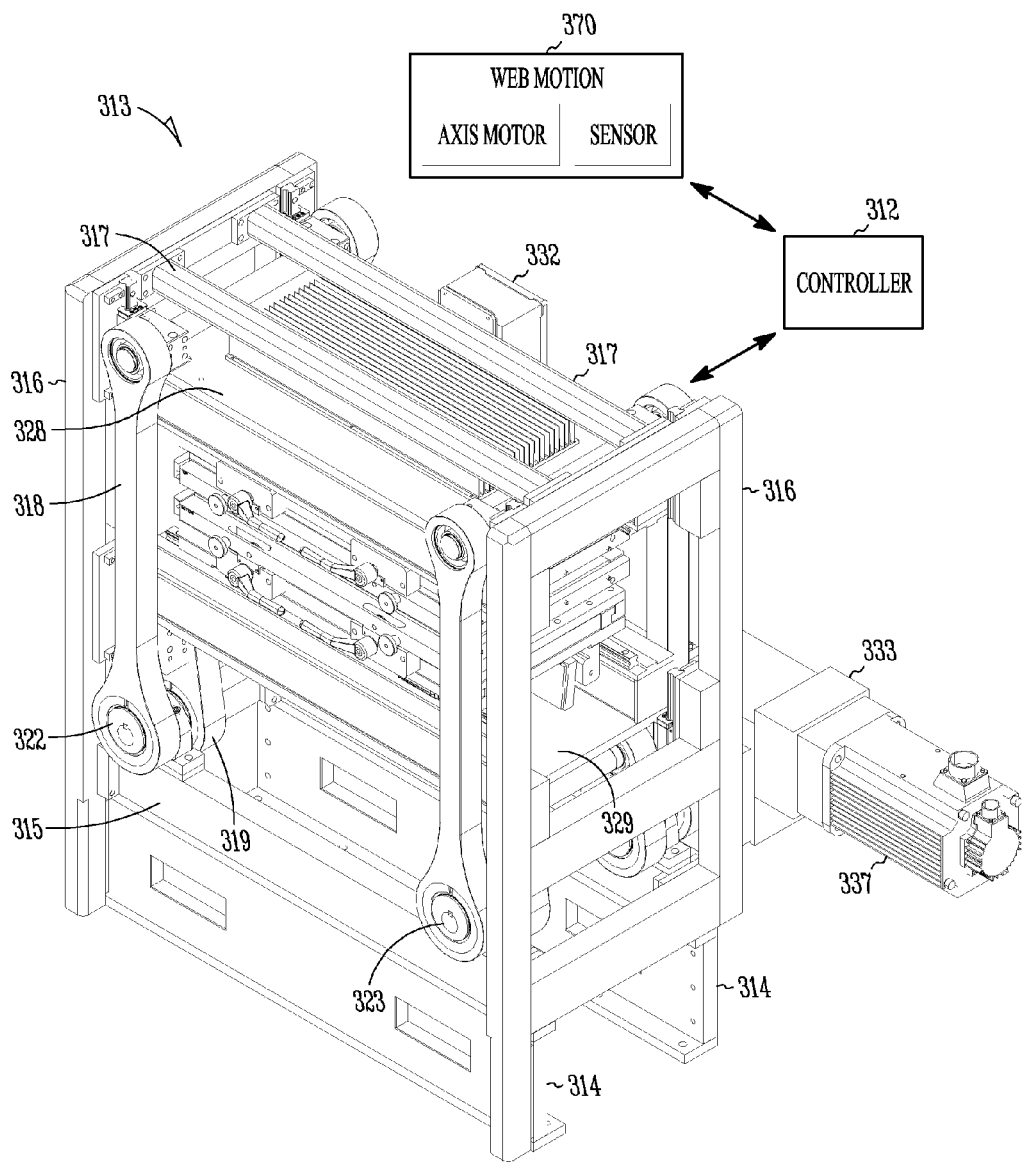
FIG. 3 illustrates a perspective view of a sealer embodiment.

FIG. 3 illustrates a perspective view of a sealer embodiment. A controller 312 is adapted to communicate with the sealer 313 to provide motion instructions to the motors, to provide heating instructions to the heating elements of the seal plate assemblies and to receive various feedback signals. The controller also monitors the motion of the web passing between the seal plates of the sealer to initiate and coordinate the sealer motion. In various embodiments, signals indicative of web motion 370 are received by the controller from either an axes integral to the controller, and providing the motion to move the web, or a sensor detecting the web motion, such as an encoder or a resolver. In the illustrated embodiment, visible components of the sealer 313 include support legs 314, lower tie bars 315, upper tie bars 317, and frame members 316. The illustrated embodiment also provides a view of some of the components that provide the clamping motion of the seal plates. These components include a plate assembly servo motor 337, mechanically coupled to a pair of shafts 323 through two gearboxes 333 (one gearbox is shown in the illustrated view). Each shaft is coupled to four tie arms, with two tie arms 318 coupled to the first seal plate assembly 328 and two tie arms 319 coupled to the second seal plate assembly 329. Each seal plate assembly is also mounted to the sealer frame through a plurality of linear bearings. Each tie arm is coupled to shaft 323 through an offset cam 322 and linkage such that when the shaft is rotated, the heat seal plates move apart in opposite directions.

Figure 4A:
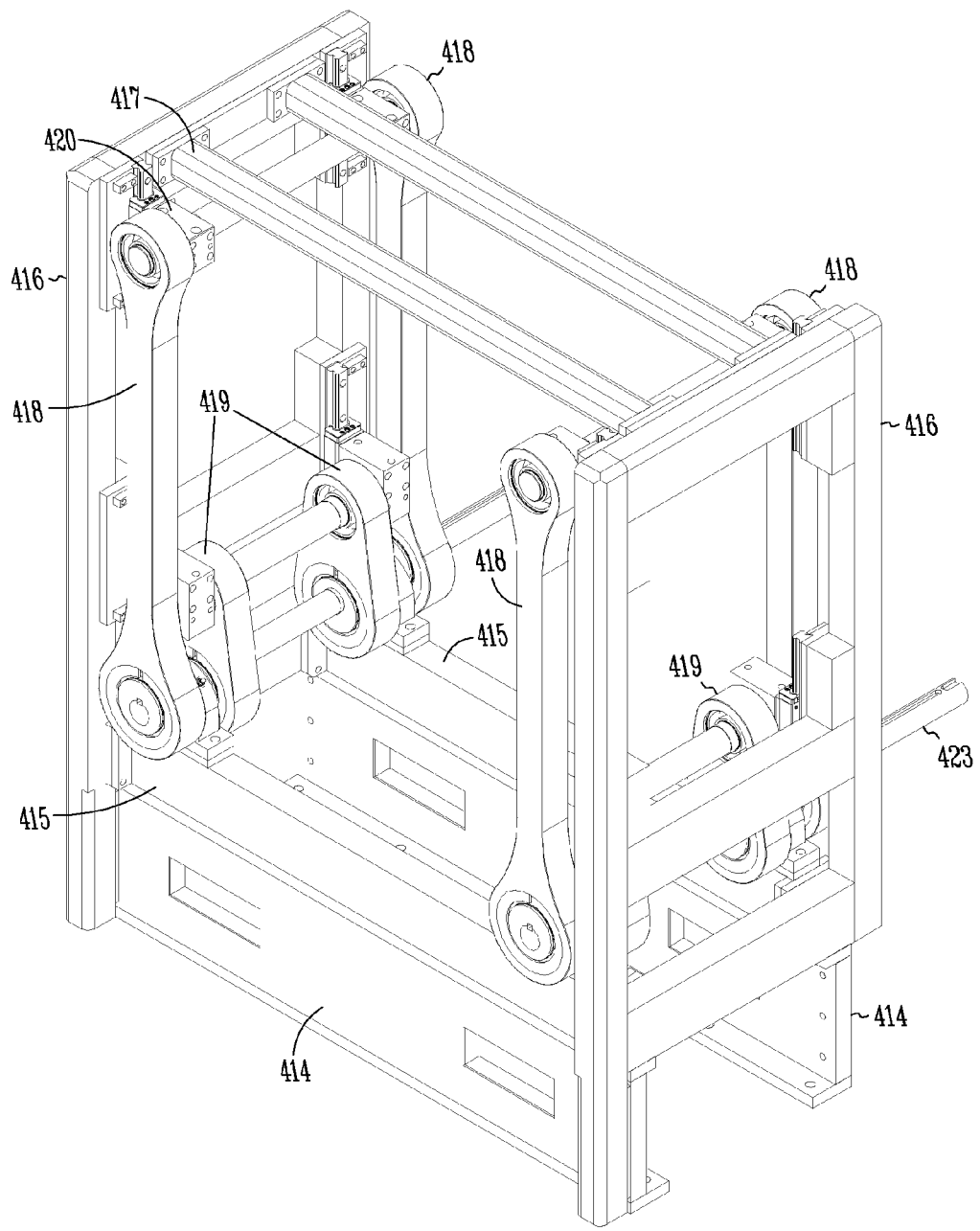
FIGS. 4A-4B illustrate a perspective view and an exploded view, respectively, of an embodiment of a sealer frame assembly.
Figure 4B:
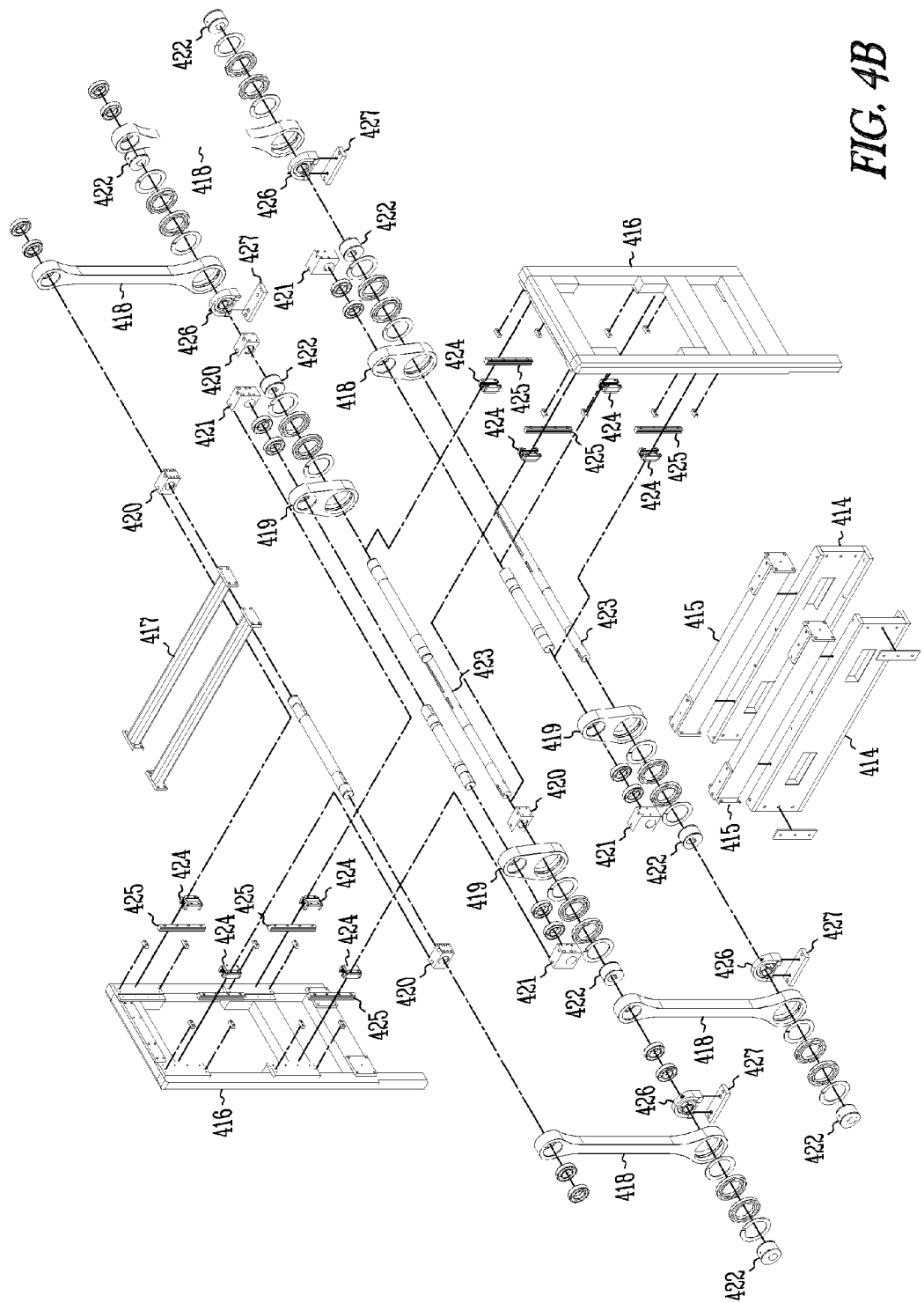

FIGS. 4A-4B illustrate a perspective view and an exploded view, respectively, of an embodiment of a sealer frame assembly. The illustrated frame assembly includes support legs 414. Lower tie bars 415 connect side frames 416 toward the bottom of the frames and are further connected to the support legs 414. Upper tie bars 417 connect side frames 416 toward the top of the frames. The illustrated assembly includes tie arms 419 to move the second plate via mounting block 421 and tie arms 418 to move the first plate assembly connected via mounting block 420. The tie bars 419 and tie bars 418 include apertures to receive eccentric cams 422, which are adapted to receive a drive shaft 423. The eccentric cams in tie bars 418 are 180 degrees out of phase with respect to the eccentric cams in tie bars 419 such that the first and second plate assemblies move in a complementary fashion (e.g. either moving simultaneously toward or simultaneously away from each other) when the drive shaft 423 is rotated. Those of ordinary skill in the art would understand upon reading and comprehending this disclosure that other mechanical linkages could be used to provide the complementary motion of the first and second seal plate assemblies. Various bearings and other hardware are illustrated to provide for a smooth operation of the linkage. Linear bearings 424 and linear bearing rails 425 are also illustrated. In the illustrated example, the rails 425 are attached to the frames 416, and the bearings 424 are attached to the mounting blocks 420 and 421 to provide a substantially vertical, linear path of motion for the first and second plate assemblies. The drive shaft 423 extends through pillow block ball bearings 426, which are attached to the tie bars 415 of the frame assembly via mount 427. Thus, the axis of the drive shaft is fixed, and the rotation of the eccentric cams 422 for the tie bars 418 and 419 causes the tie bars, and thus the upper and lower plates, to move with respect to the frame assembly.

Figure 5:
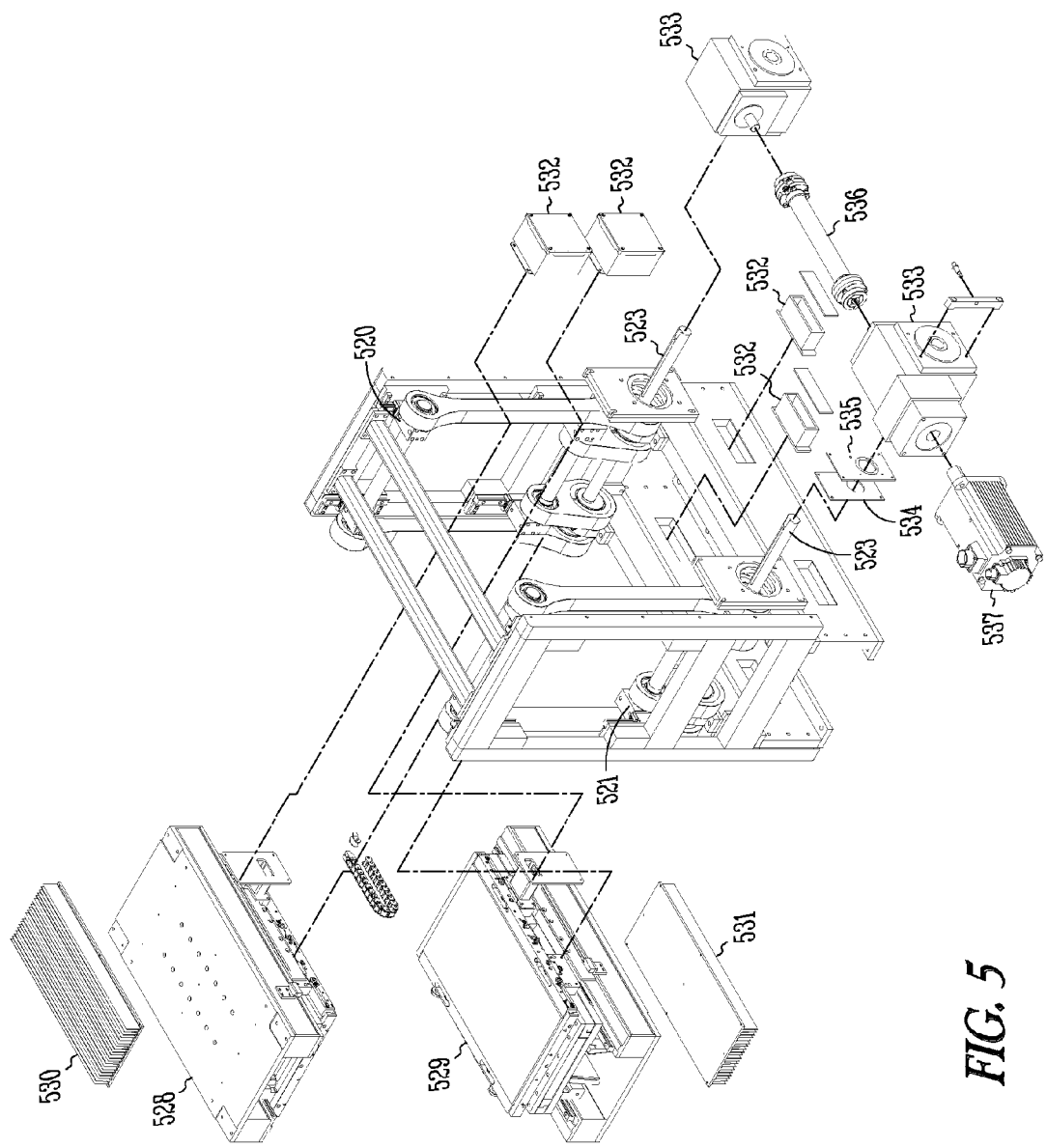
FIG. 5 illustrates an exploded view of a system embodiment, including the sealer frame assembly of FIG. 4A, first and second plate assemblies, and a plate assembly motor.

FIG. 5 illustrates an exploded view of a system embodiment, including the sealer frame assembly of FIG. 4A, first and second plate assemblies, and a plate assembly motor. Illustrated are a first seal plate assembly, or upper plate seal bed 528, and a second seal plate assembly, or lower plate seal bed 529. Also illustrated are an upper heat sink 530 attached to the upper plate seal bed 528 and a lower heat sink 531 attached to the lower plate seal bed 529. The seal beds 528 and 529 are linked to the tie bars using mounting blocks 520 and 521, respectively, also illustrated as 420 and 421 in FIG. 4B. Electrical boxes 532 are provided for use in providing the control wiring to the seal beds. Reducer gear boxes 533 are connected to drive shafts 523. The gear boxes 533 are connected to the frame using an isolation pad 534 and a mounting plate 535. A floating coupling 536 links the gears boxes 533. A plate assembly servo motor 537 is connected to the gear boxes. Thus, the servo motor accurately rotates the drive shafts 523, which accurately moves the seal beds 528 and 529 through the eccentric cams. The plates can be moved through a large number of incremental positions between a maximum distance and minimum distance from each other. The maximum distance depends on the dimensions of the eccentric cam and other mechanical linkages.

Figure 6A:
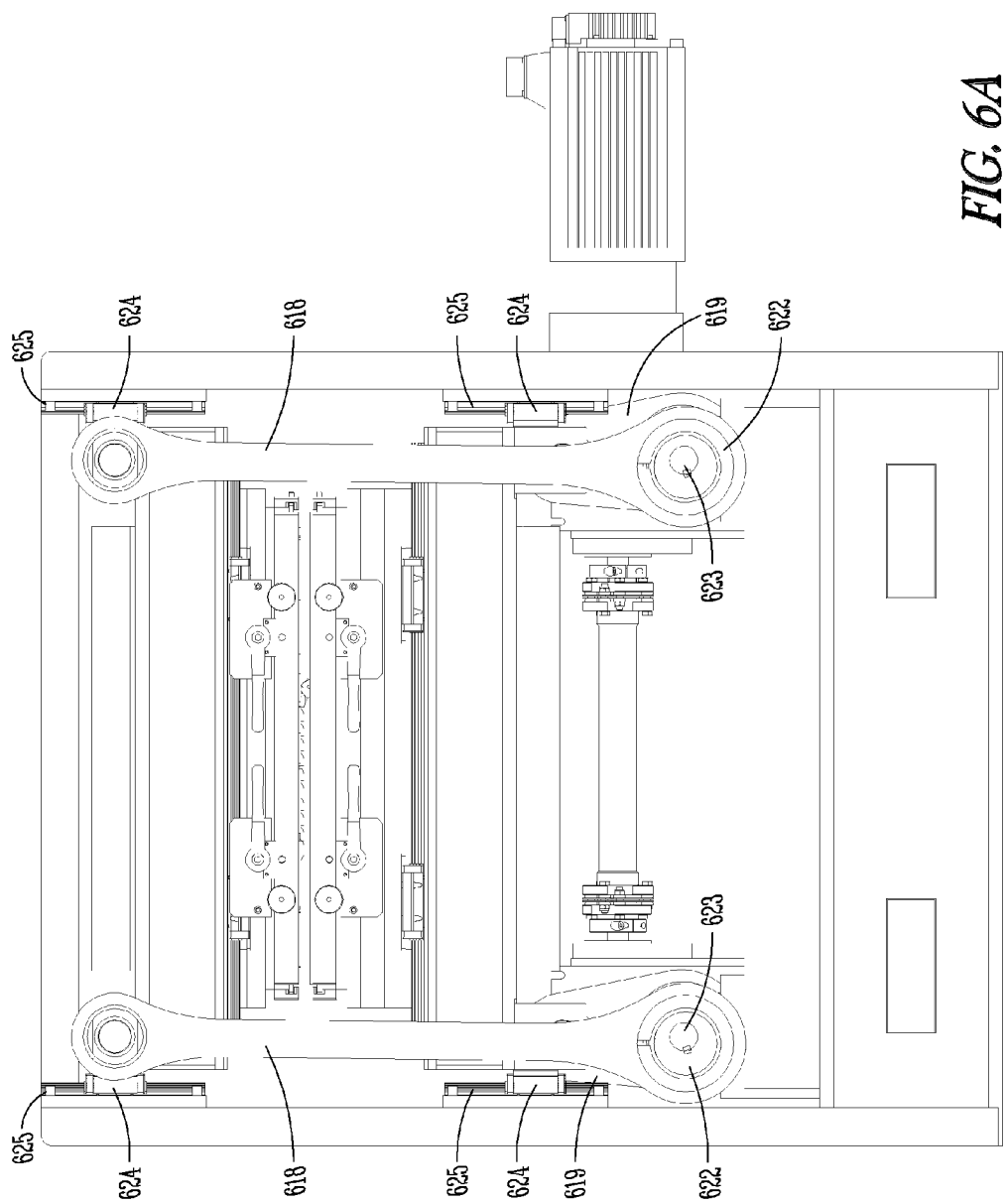
FIGS. 6A-6B illustrate a front view of a sealer embodiment in an open and close position, respectively.
Figure 6B:
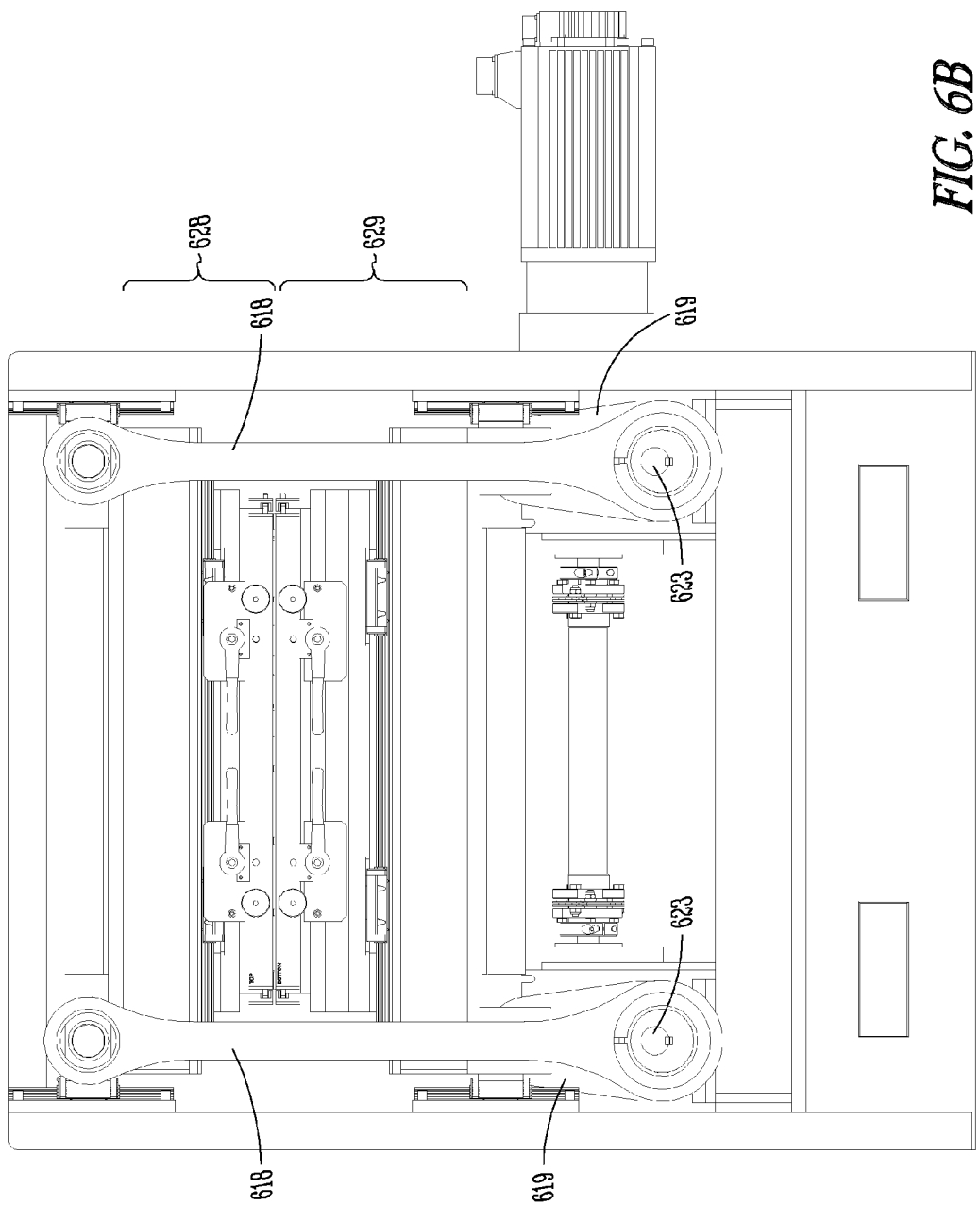

FIGS. 6A-6B illustrate a front view of a sealer embodiment in a partially open and a close position, respectively. The figure illustrates the tie bars 618 and 619, the drive shafts 623, and the eccentric cams 622 for tie bars 618. The eccentric cams for ties bars 618 are 180 degrees out of phase such that tie bars 618 move in a complementary fashion with respect to tie bars 619. The frame assembly is designed with symmetry to balance the complementary forces. The figure also illustrates the linear bearings 624 and rails 625 used to guide the vertical motion of the seal beds to provide the vertical motion in the motion profile illustrated in FIG. 2. In FIG. 6B, the drive shafts 623 are shown rotated about 45 degrees, from their position in FIG. 6A, to simultaneously raise the tie bars 619 and the second seal plate assembly 629, and lower the tie bars 618 and the first seal plate assembly 628.

Figure 7A:
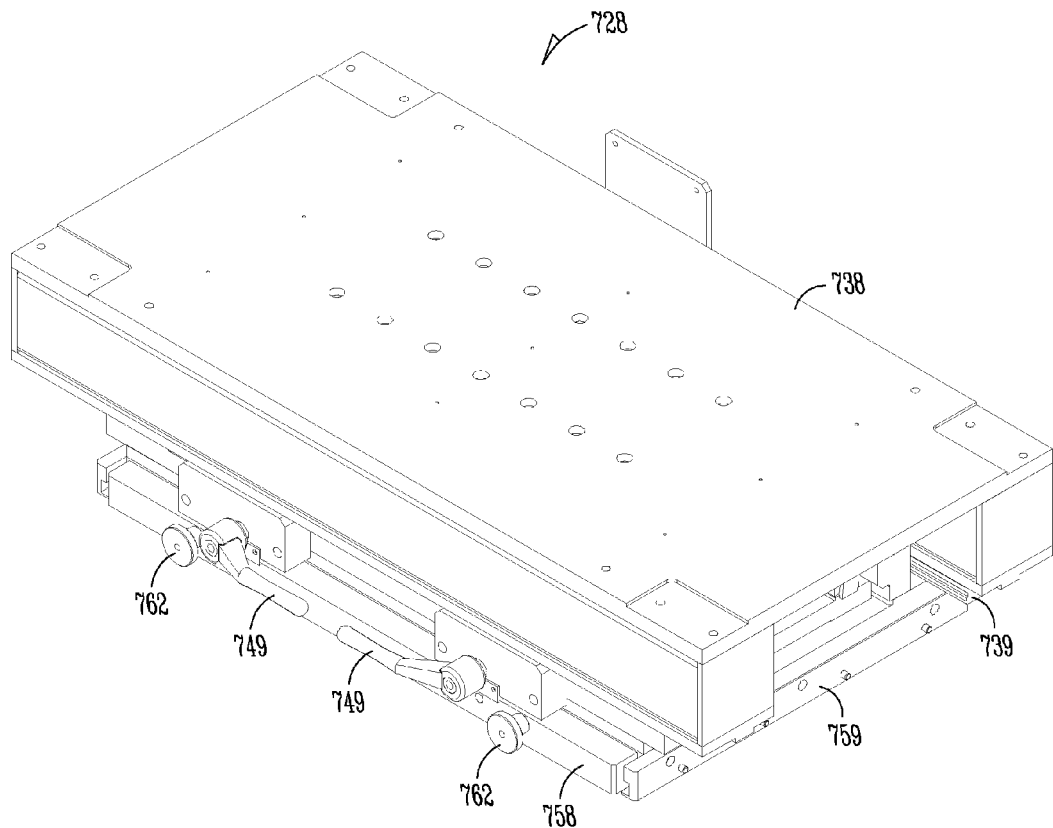
FIGS. 7A-7B illustrate perspective views and FIG. 7C illustrates an exploded view of an embodiment of a top seal plate assembly.
Figure 7B:
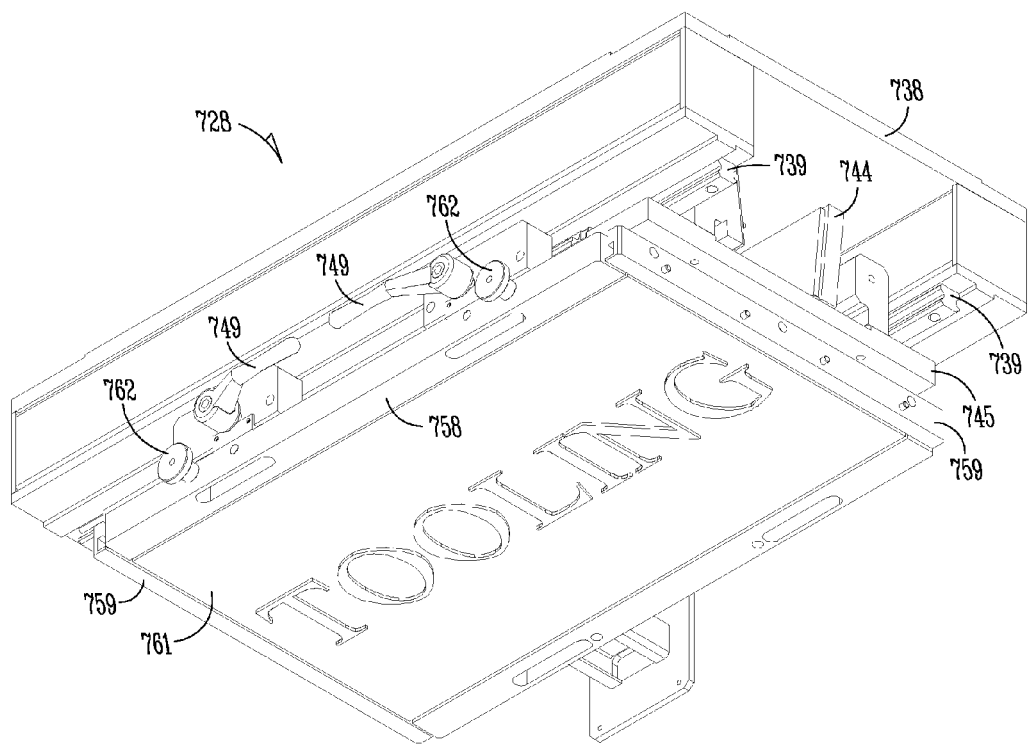
Figure 7C:
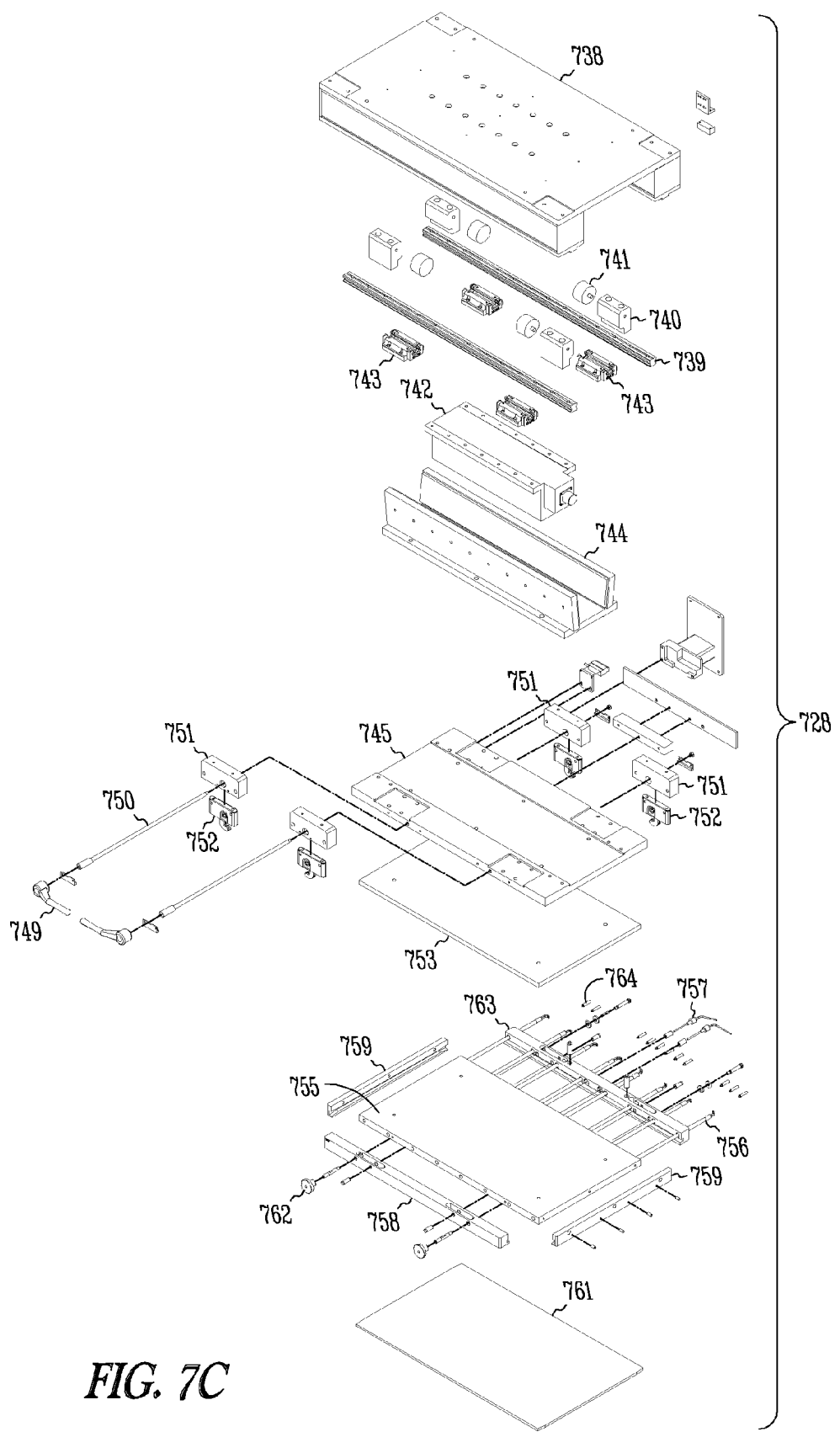

FIGS. 7A-7B illustrate perspective views and FIG. 7C illustrates an exploded view of an embodiment of a first seal plate assembly. The seal plate assembly includes a base 738. Linear bearing rails 739 are attached to the base, along with stop blocks 740 and bumpers 741 to limit the linear motion of a servo motor magnet 744. The linear bearing rails are included to support and guide the horizontal motion profile illustrated in FIG. 2. A linear servo motor 742 is attached to the base 738. Linear bearings 743 are attached, along with the linear servo motor magnet 744, to a magnet mount 745. The linear bearings 743 allow the servo motor magnet 744 and magnet mount to glide along the bearing rails 739. An isolation plate 753 is connected to the magnet mount 745. A heated plate 755, with inserted heater rods 756, is connected to the isolation plate. A thermocouple 757 is also illustrated, the heater rods 756 and the thermocouple 757 are electrically connected to the controller to facilitate a close looped heating system. A tooling plate 761 is held in place, next to the heated plate, between a pair of tooling guides 759 and is further secured with an operator side tooling clamp bar 758 and a machine side tooling clamp bar 763. Clamping handles 749, hex shaft 750, hold down clamps 752 and hold down clamp mounts 751 cooperate to secure the operator tooling clamp bar 758 and machine side tooling clamp bar 763. The operator side tooling clamp bar 758 is further secured with a pair of hand tightened bolts 762. The hand tightened bolts 762 extend through clearance holes in the operator side tooling clamp bar 758 and thread into the heated plate 755. In various embodiments, spring loaded detent pins 764, installed in the machine side tooling clamp bar 763, spring loading the tooling plate 761 in the cross web direction. The hand tighten bolts 762 secure the tooling plate 761, against the spring loaded detent pins 764. Further engagement of the tooling plate against the spring loaded detent pins 764 allow fine adjustment of the position and alignment of the tooling plate 761 with respect to the web.

Figure 8A:
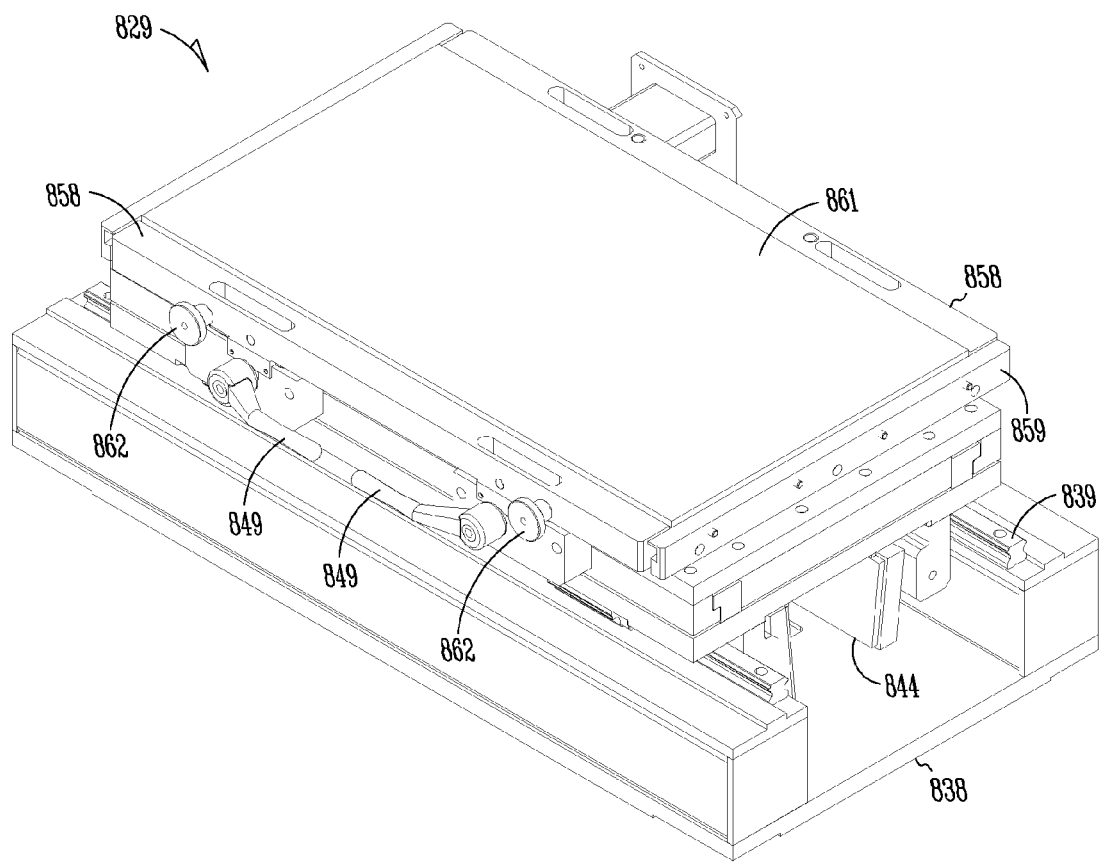
FIGS. 8A-8B illustrate a perspective and exploded view, respectively, of an embodiment of a bottom seal plate assembly.
Figure 8B:
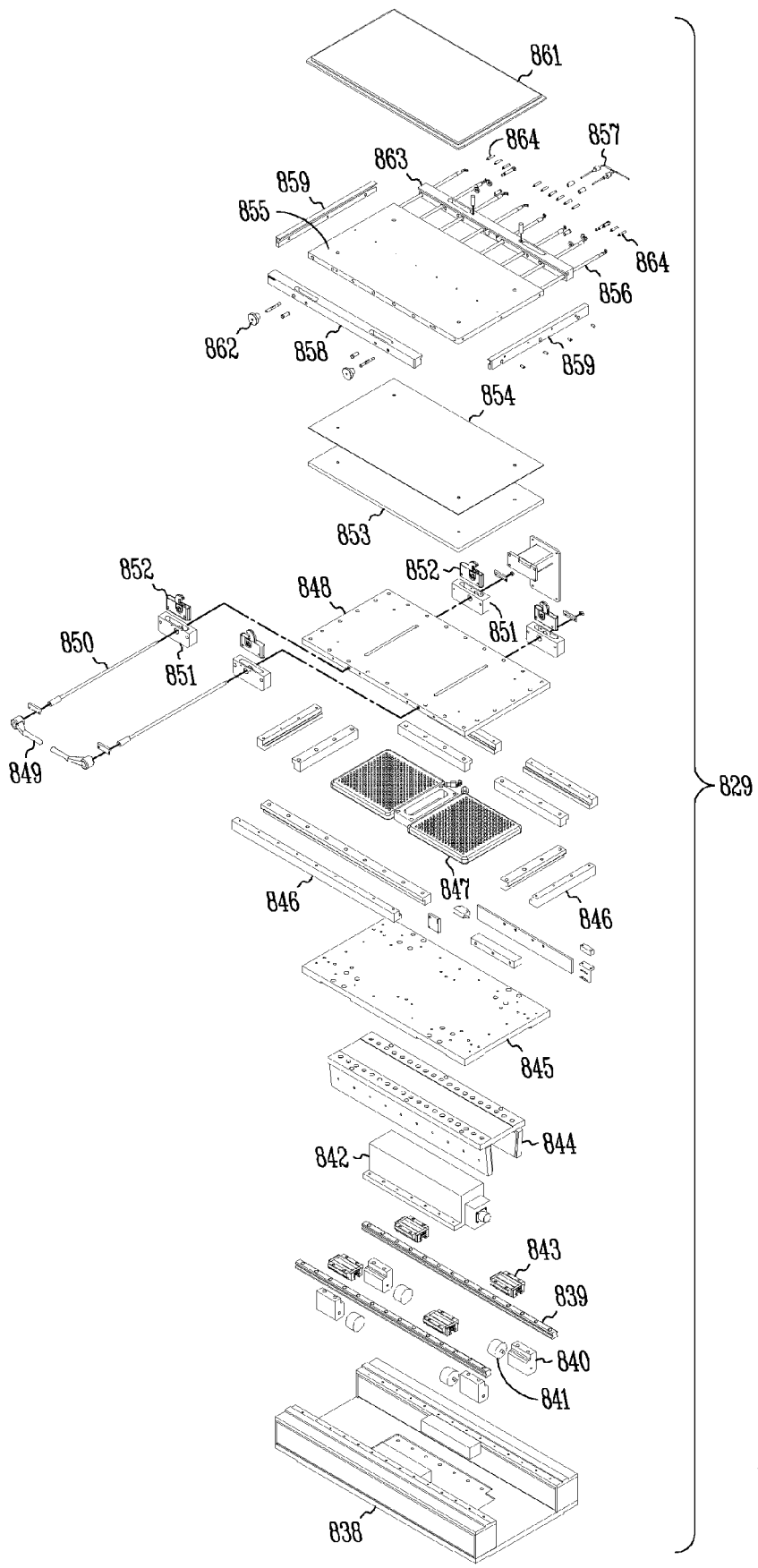

FIGS. 8A-8B illustrate a perspective and exploded view, respectively, of an embodiment of a second seal plate assembly. The seal plate assembly includes a base 838. Linear bearing rails 839 are attached to the base, along with stop blocks 840 and bumpers 841 to limit the linear motion of a servo motor magnet. A linear servo motor 842 is attached to the base 838. Linear bearings 843 are attached, along with the linear servo motor magnet 844, to a magnet mount 845. The linear bearings 843 allow the servo motor magnet 844 and magnet mount to glide along the bearing rails 839. Air bladder hard stops 846 are attached around a periphery of mount 845, and an air bladder 847 is positioned over the mount. An air bladder backplate 848 is attached to the hard stops 846. An isolation plate 853 and seal plate spacer 854 are positioned over the air bladder backplate 848. A heated plate 855, with heater rods 856, are positioned over the seal plate spacer. A thermocouple 857 is also illustrated, the heater rods 856 and the thermocouple 857 are electrically connected to the controller to facilitate a close looped heating system. A tooling plate 861 is held in place, next to the heated plate, between a pair of tooling guides 859 and is further secured with an operator side tooling clamp bar 858 and a machine side tooling clamp bar 863. Clamping handles 849, hex shaft 850, hold down clamps 852 and hold down clamp mounts 851, cooperate to secure the tooling clamp bar 858. The tooling clamp bar is further secured with a pair of hand tightened bolts 862. The hand tightened bolts 862 extend through clearance holes in the operator side tooling clamp bar 858 and thread into the heated plate 855. The tooling clamps 858 can be released and hand tightened bolts 862 and tooling clamp bar removed allowing the tooling plate 861 to be slid out between the tooling guides 859. In various embodiments, spring loaded detent pins 864, installed in the machine side tooling clamp bar 863, spring load the tooling plate 861 in the cross web direction. The hand tighten bolts 862 secure the tooling plate 861, against the spring loaded detent pins 864 via the operator side tooling clamp bar. Further engagement of the tooling plate 861 against the spring loaded detent pins 864 allow fine adjustment of the position and alignment of the tooling plate 861 with respect to the web.

In the illustrated embodiment, an air bladder, or bladders, are used to even pressure across the entire plate. Some embodiments provide an air bladder in the first or upper seal plate assembly, some embodiments provide an air bladder in the second or lower seal plate assembly, and some embodiments provide an air bladder in both the first and second seal plate assemblies. The illustrated embodiment provides the air bladder only for the bottom seal bed. The air bladder is filled, and rests on hard stops until the upper plate contacts the lower plate, pushing the lower seal plate off the hard stops. The seal pressure is controlled by the pressure of the bladder.

Figure 9A:
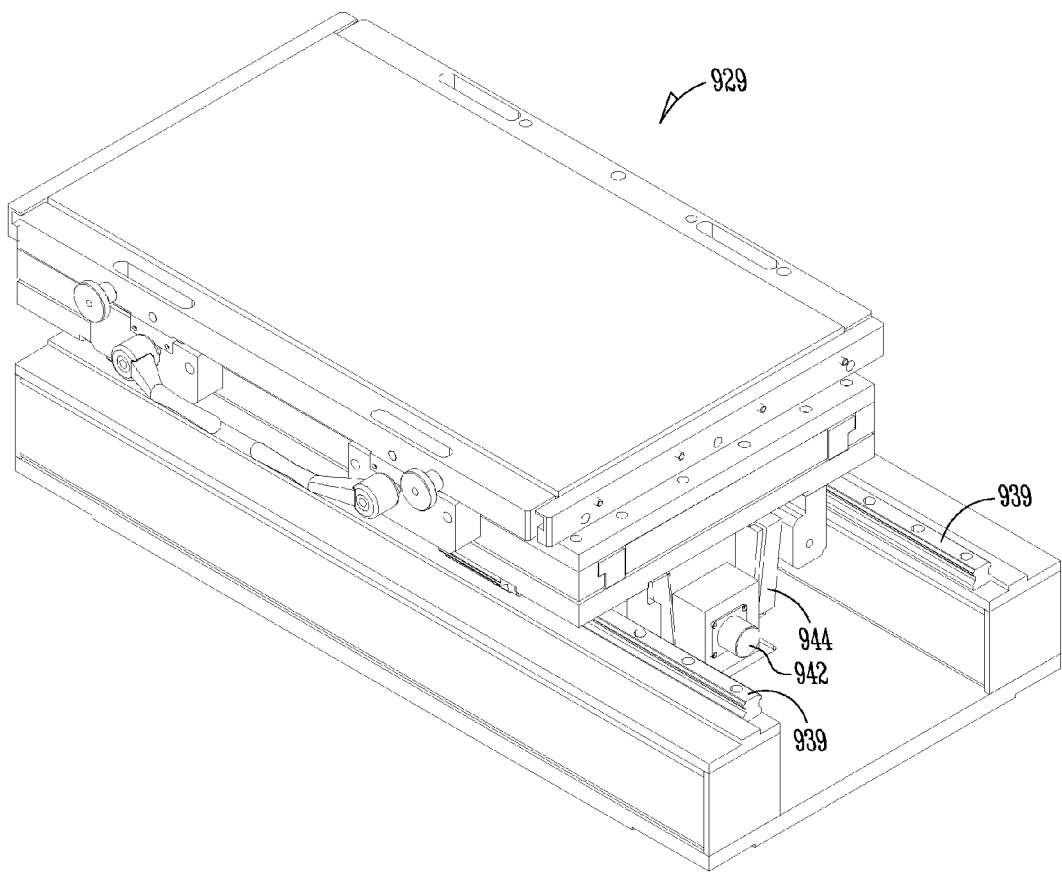
FIGS. 9A-9B illustrate linear motion of a seal plate using linear servo motors.
Figure 9B:
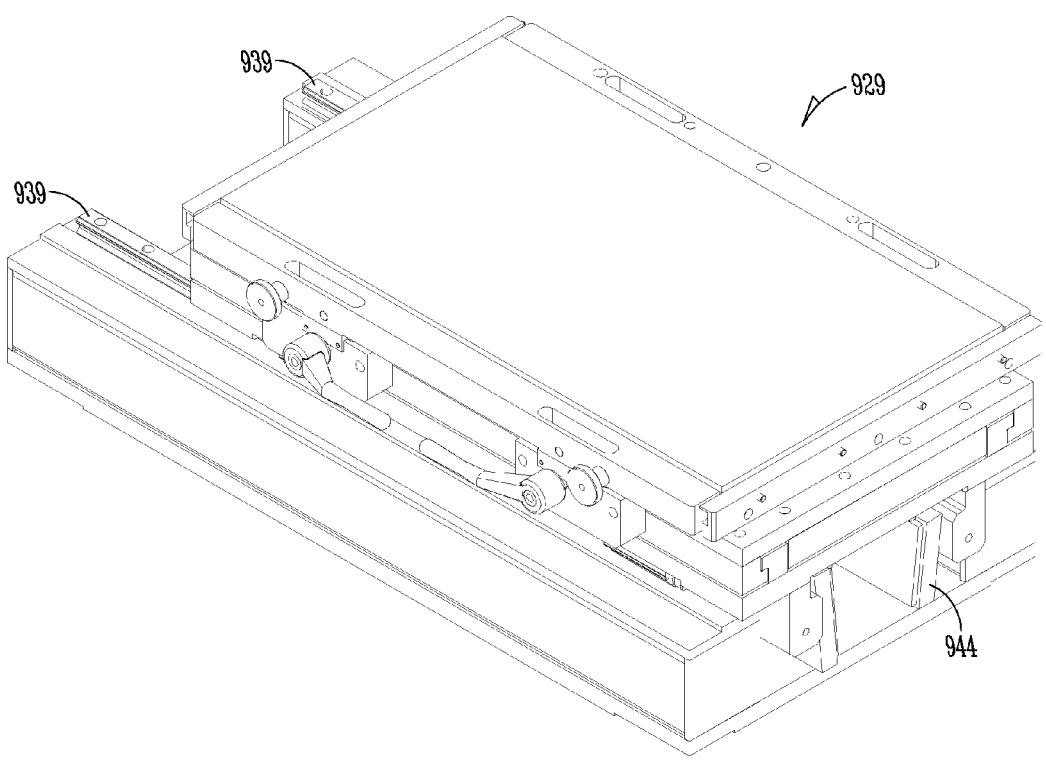

FIGS. 9A-9B illustrate linear motion of a seal plate assembly 929 using linear servo motors. The illustrated embodiment in FIG. 9A shows a seal plate assembly 929 where the seal plate is at or near one end of its linear travel range. In FIG. 9A, the linear motor 942 and a portion of the linear motor magnet 944 are visible. Also visible is a portion of the linear bearing rails 939. In FIG. 9B, the illustrated embodiment of the seal plate assembly of FIG. 9A is shown at or near the opposite end of its linear travel range. The linear motor 942 is no longer visible. FIGS. 9A-B generally show embodiments of the second seal plate assembly. The motion of embodiments of the first seal plate assembly operate on the same principles as that of the second seal plate assembly.

Figure 10:
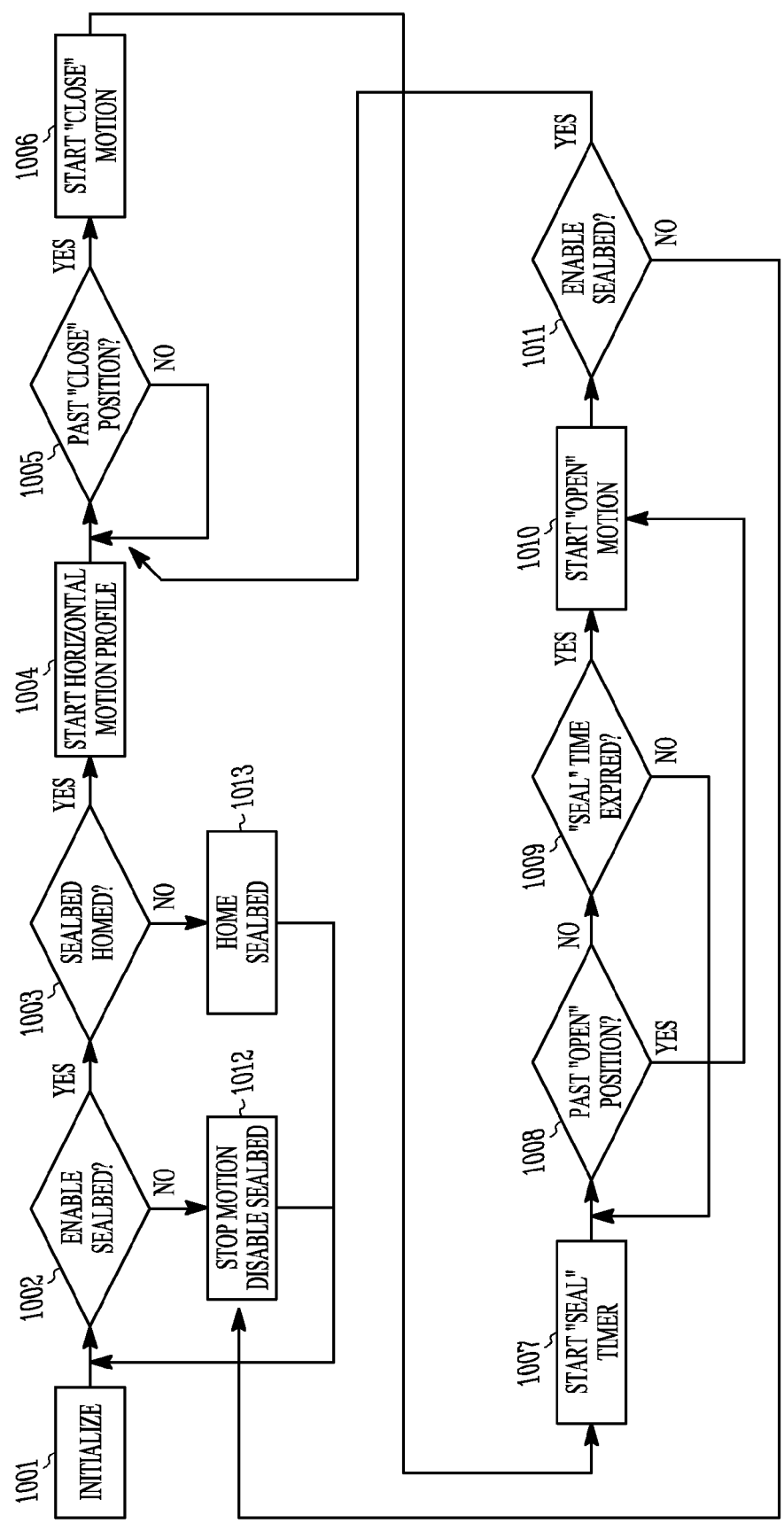
FIG. 10 illustrates a flow diagram for operating the sealer, according to various embodiments.

FIG. 10 illustrates a flow diagram for a process of operating the sealer, according to various embodiments. The process flow is controlled by logic programmed into the controller. Those of ordinary skill in the art will understand upon reading and comprehending this disclosure how the flow diagram corresponds to the motion profile illustrated in FIG. 2. The process begins when the sealer is initialized 1001. In various embodiments, initialization 1001 includes preheating the seal plates, setting and verifying the motion profiles for each of the servo motor axes, setting the seal air pressure, setting the seal dwell time and enabling or disabling the operation of the sealer or a portion thereof. After initialization 1001, the machine controller will monitor whether the sealer is enabled 1002. In various embodiments, if the sealer is not enabled, the machine controller will stop any linear motion of the sealer and move the plate assembly servo motor (337 in FIG. 3) to a position maximizing the distance between position of the seal plates assemblies 1012. If the sealer is enabled, the axes will need to be "homed" 1013 before the normal cyclical motion can take place. "Homing" 1013 allows the machine controller to reference the position of the servo axes with a physical location. In various embodiments, the physical reference is determined by moving each of the axes until the axis triggers a reference switch. The machine controller monitors the position of the axis when the reference switch is triggered. The machine controller, in various embodiments, references subsequent motion from the position of the axis when it triggered the switch.

Once homed, the motion control monitors an axis indicative of the web motion, and initiates and coordinates the motion of the sealer with respect to the motion of the web. The first coordination task initiates a repeating process which controls the motion of the seal plate assemblies to accelerate and match the horizontal speed with the speed of the web 1004. The motion controller monitors the position of the seal assemblies. When the seal assemblies move past a "close" trigger position 1005, the machine controller will initiate and control the motion of the plate assembly servo motor to move the seal plates toward each other to clamp the web between the seal plates 1006. With the web clamped between the seal plates, the machine controller begins a seal dwell timer 1007. In various embodiments, the machine controller then monitors events to initiate opening the seal plates. In various embodiments, the termination of the seal dwell timer 1009 functions as the event to trigger opening of the seal plates. However, in various embodiments, if the seal dwell is set too long, the seal plates will open when the linear motors used to move the seal plates near the end of the linear travel, even if the seal time has not expired (i.e. seal time set too long or web moving too fast). As the linear motors approach the end of their travel, the task initiated in step 1004 stops the linear motors and moves them back to their initial position for the start another seal cycle. The sealer will continue to cycle until the sealer is disabled 1011.

Figure 11A:
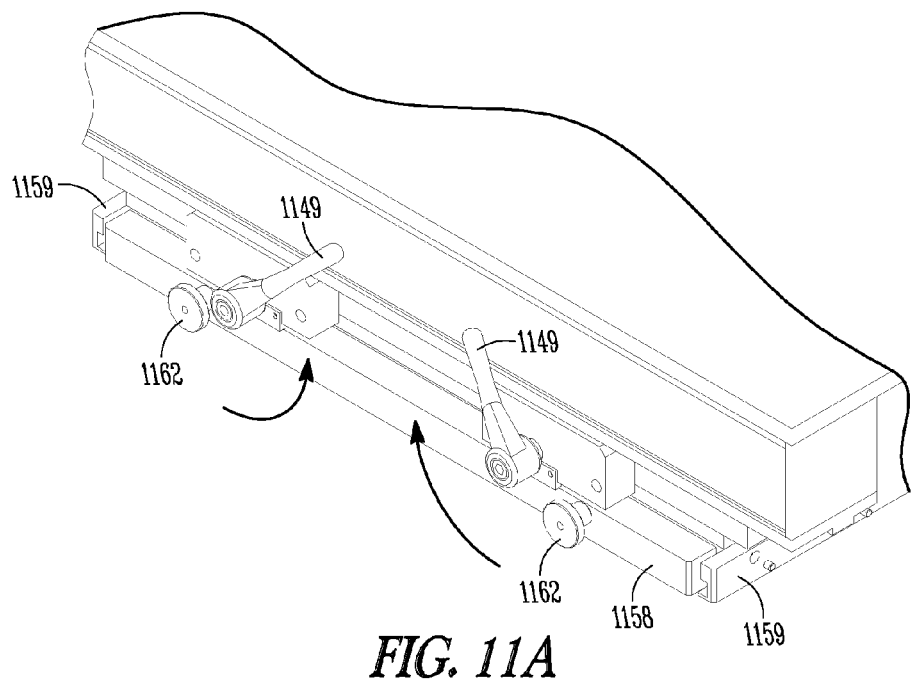
FIGS. 11A-11C illustrate a method of changing seal plate tooling according to various embodiments.
Figure 11B:
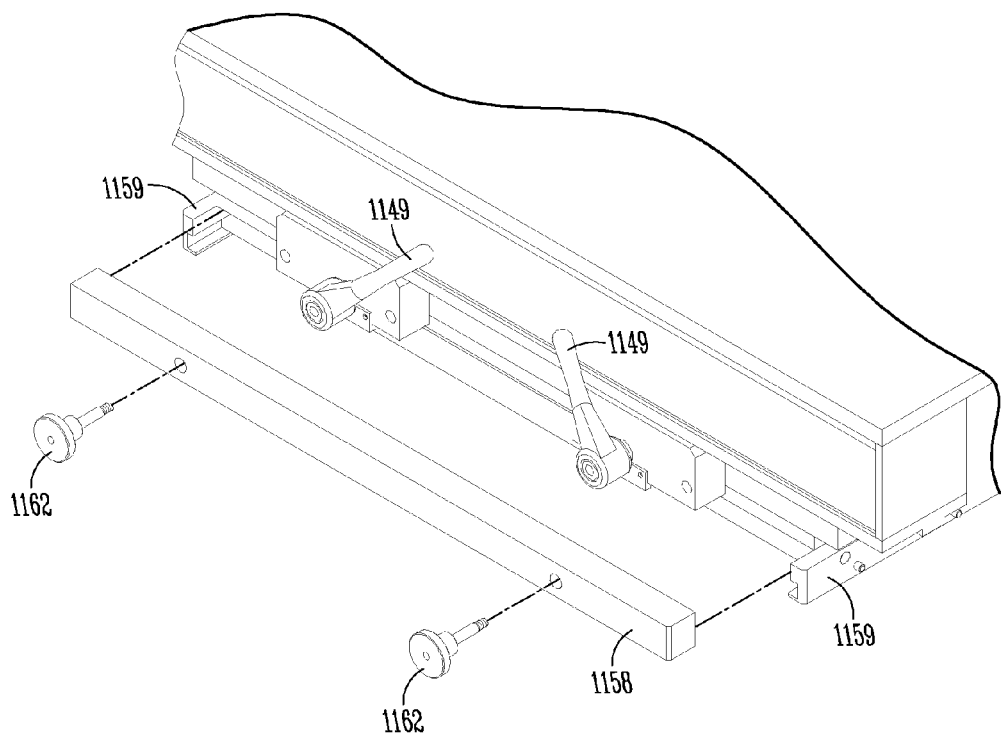
Figure 11C:
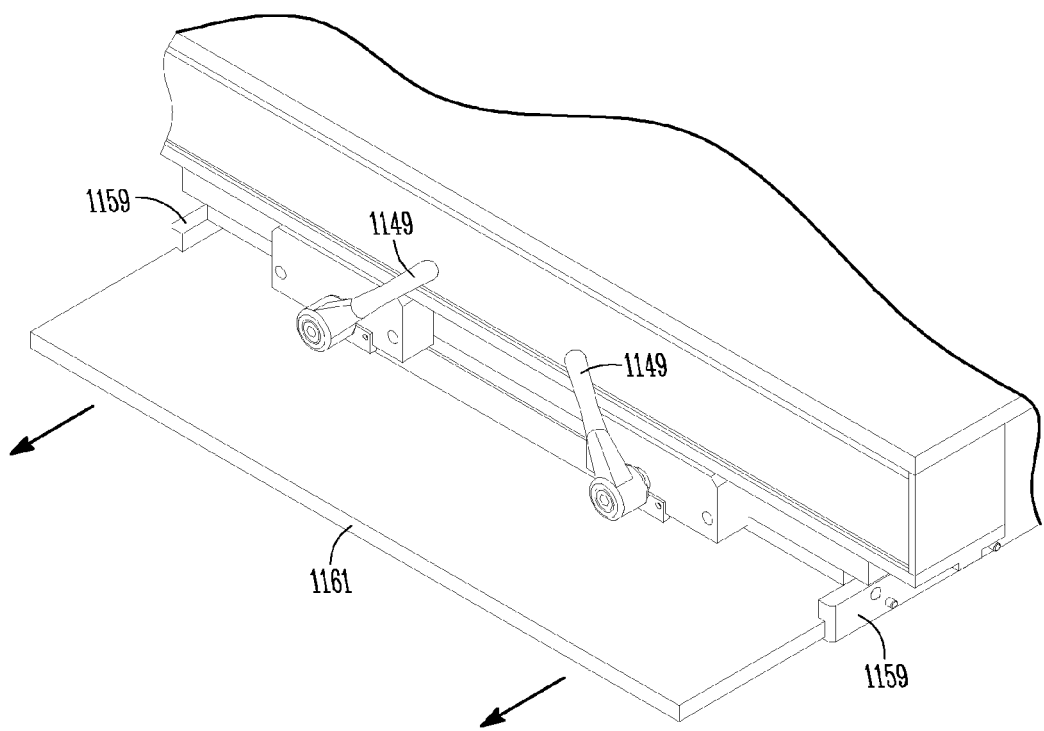

FIGS. 11A-11C illustrate a method of removing seal plate tooling according to various embodiments. FIG. 11A illustrates the operation of the clamping handles 1149 to release the tooling clamp bar 1158. FIG. 11B illustrates the removal of the tooling clamp bar 1158. The tooling clamp bar 1158 is removed after unthreading two bolts 1162 that are used to hold the tooling clamp bar near the heat plate. After removal of the tooling clamp bar, FIG. 11C illustrates the removal of the tooling plate 1161. The tooling plate 1161 is removed by sliding the plate out of the slots in tooling guides 1159. Installation of a tooling plate is achieved by repeating the process in the reverse order. The cam action clamps 1149 provide the ability to change upper and lower seal plates, regardless of whether the seal plates are cold or hot. The ability to change hot seal plates reduces changeover times, as operators do not have to wait for the tooling to cool.

The present subject matter is capable of sealing a web while the web is traveling. The present subject matter provides repeatable and consistent seal times for the seal operation. The servo driven motors provide multiple open positions. The sealer is able to accurately control the position of the seal beds, thus controlling the seal times.

One of ordinary skill in the art will understand that, the modules and other circuitry shown and described herein can be implemented using software, hardware, and combinations of software and hardware. As such, the illustrated modules and circuitry are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined.

In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions contained on a computer-accessible medium capable of directing a processor to perform the respective method. In various embodiments, the medium is a magnetic medium, an electronic medium, or an optical medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed is:

1. A method for performing a sealing operation on a linearly moving web, the method comprising:
   moving the web along a linear web path passing between a first seal plate having a first seal area and a second seal plate, wherein the web has a width and the first seal area of the first seal plate having length in a direction in line with the web greater than the width of the web;
   implementing a motion profile for the first seal plate and the second seal plate, the motion profile including a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path, wherein implementing the motion profile includes maintaining the first and second seal plates substantially parallel to each other and to the linear web path when the first and second seal plates are moved into contact with the web; and
   applying a desired pressure between the first and second seal plates throughout the sealing operation, wherein applying a desired pressure includes using an air bladder to distribute the desired pressure about the first seal area.

2. The method of claim 1, further comprising heating the first seal plate and the second seal plate to a desired seal temperature.

3. The method of claim 2, further comprising programming a desired seal time and a desired seal pressure for the sealing operation, wherein implementing a motion profile for the first seal plate and the second seal plate includes implementing a motion profile to move the first and second seal plates into contact with each other to provide the desired seal time and desired seal pressure.

4. The method of claim 1, wherein implementing a motion profile includes implementing a motion profile using linear servo motors to move the first and second seal plates substantially parallel with the web path at a velocity substantially equal to a velocity of the web.

5. The method of claim 1, wherein implementing a motion profile for the first seal plate and the second seal plate includes implementing a motion profile using a servo motor to rotate a first eccentric cam and a second eccentric cam, the first eccentric cam and the second eccentric cam being oriented 180 degrees out of phase from each other and adapted to move the first seal plate and the second seal plate into contact with the web to perform the sealing operation.

6. The method of claim 1, wherein using the air bladder includes using an air bladder to distribute the desired pressure substantially equally about the first seal area.

7. The method of claim 1, wherein using the air bladder includes using an air bladder positioned between an air bladder back plate and a mount, wherein an air bladder hard stop is connected to the mount and the air bladder back plate.

8. The method of claim 1, wherein the air bladder has a footprint that substantially corresponds to the first seal area.

9. The method of claim 1, wherein using the air bladder includes programming a setpoint and using the setpoint to regulate pressure within the air bladder to provide the desired pressure during the sealing operation.

10. The method of claim 1, wherein at least one of the first seal plate or the second plate include a tooling plate frame with an opening, the method further comprising loading a tooling plate through the side opening into the tooling plate frame, and securing the tooling plate with respect to the tooling plate frame for the sealing operation.

11. The method of claim 10, wherein loading the tooling plate through the side opening includes using spring loaded pins at an end of the tooling plate frame opposite the opening to assist with loading the tooling plate, and using threaded bolts to adjust the tooling plate against the spring loaded pins.

12. The method of claim 1, wherein the sealing operation includes sealing pouches with a peripheral seal.

13. A method for performing a sealing operation on a linearly moving web, the method comprising:
   programming a desired seal time and a desired seal pressure for the sealing operation;
   moving the web along a linear web path passing between a first seal plate having a first seal area and a second seal plate, wherein the web has a width and the first seal area of the first seal plate having length in a direction in line with the web greater than the width of the web;
   implementing a motion profile for the first seal plate and the second seal plate, the motion profile including a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path, wherein implementing the motion profile includes maintaining the first and second seal plates substantially parallel to each other and to the linear web path when the first and second seal plates are moved into contact with the web and implementing a motion profile to move the first and second seal plates into contact with each other to provide the desired seal time and desired pressure; and
   applying a desired pressure between the first and second seal plates throughout the sealing operation, wherein applying a desired pressure includes using an air bladder to distribute the desired pressure substantially equal about the first seal area, wherein using the air bladder includes: using the air bladder to distribute the desired pressure substantially equal about the first seal area, and using the air bladder positioned between an air bladder back plate and a mount, wherein an air bladder hard stop is connected to the mount and the air bladder back plate.

14. The method of claim 13, further comprising heating the first seal plate and the second seal plate to a desired seal temperature.

15. The method of claim 13, wherein implementing a motion profile includes implementing a motion profile using linear servo motors to move the first and second seal plates substantially parallel with the web path at a velocity substantially equal to a velocity of the web.

16. The method of claim 13, wherein implementing a motion profile for the first seal plate and the second seal plate includes implementing a motion profile using a servo motor to rotate a first eccentric cam and a second eccentric cam, the first eccentric cam and the second eccentric cam being oriented 180 degrees out of phase from each other and adapted to move the first seal plate and the second seal plate into contact with the web to perform the sealing operation.

17. The method of claim 13, wherein at least one of the first seal plate or the second plate include a tooling plate frame with an opening, the method further comprising loading a tooling plate through the side opening into the tooling plate frame, and securing the tooling plate with respect to the tooling plate frame for the sealing operation.

18. A method for performing a sealing operation on a linearly moving web, the method comprising:
   programming a desired seal time and a desired seal pressure for the sealing operation;
   moving the web along a linear web path passing between a first seal plate having a first seal area and a second seal plate, wherein the web has a width and the first seal area of the first seal plate having length in a direction in line with the web greater than the width of the web;
   implementing a motion profile for the first seal plate and the second seal plate, the motion profile including a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path, wherein implementing the motion profile includes implementing a motion profile to move the first and second seal plates into contact with each other to provide the desired seal time and desired pressure, wherein implementing the motion profile includes:
      maintaining the first and second seal plates substantially parallel to each other and to the linear web path when the first and second seal plates are moved into contact with the web;
      implementing a motion profile using linear servo motors to move the first and second seal plates substantially parallel with the web path at a velocity substantially equal to a velocity of the web; and
      implementing a motion profile using a servo motor to rotate a first eccentric cam and a second eccentric cam, the first eccentric cam and the second eccentric cam being oriented 180 degrees out of phase from each other and adapted to move the first seal plate and the second seal plate into contact with the web to perform the sealing operation; and
   applying a desired pressure between the first and second seal plates throughout the sealing operation, wherein applying a desired pressure includes using an air bladder to distribute the desired pressure substantially equal about the first seal area, wherein using the air bladder includes: using the air bladder to distribute the desired pressure substantially equal about the first seal area, and using the air bladder positioned between an air bladder back plate and a mount, wherein an air bladder hard stop is connected to the mount and the air bladder back plate.

19. The method of claim 18, further comprising heating the first seal plate and the second seal plate to a desired seal temperature.

20. The method of claim 18, wherein at least one of the first seal plate or the second plate include a tooling plate frame with an opening, the method further comprising loading a tooling plate through the side opening into the tooling plate frame, and securing the tooling plate with respect to the tooling plate frame for the sealing operation.

* * * * *